(12) United States Patent
Goodfellow

(10) Patent No.: US 9,335,062 B2
(45) Date of Patent: May 10, 2016

(54) DYNAMIC BUILDING AIR BALANCING USING BAROMETRIC PRESSURE

(75) Inventor: John A. Goodfellow, Waterloo (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 769 days.

(21) Appl. No.: 13/418,973

(22) Filed: Mar. 13, 2012

(65) Prior Publication Data

US 2013/0245836 A1  Sep. 19, 2013

(51) Int. Cl.
*G06F 19/00* (2011.01)
*F24F 11/00* (2006.01)
*G05D 16/20* (2006.01)

(52) U.S. Cl.
CPC ........ *F24F 11/0001* (2013.01); *G05D 16/2073* (2013.01); *F24F 2011/0042* (2013.01)

(58) Field of Classification Search
CPC ................. F24F 2011/0041; F24F 2011/0042; B01L 1/02; B01L 1/04
USPC ........... 454/187, 238, 239, 255, 256; 700/301
See application file for complete search history.

(56) References Cited

U.S. PATENT DOCUMENTS

| | | | | |
|---|---|---|---|---|
| 4,705,457 | A * | 11/1987 | Belusa | 417/22 |
| 4,897,798 | A | 1/1990 | Cler | |
| 5,257,958 | A * | 11/1993 | Jagers | 454/238 |
| 5,259,553 | A * | 11/1993 | Shyu | 236/49.3 |
| 5,418,438 | A | 5/1995 | Hollenbeck | |
| 5,538,471 | A | 7/1996 | Guiles, Jr. | |
| 6,514,138 | B2 * | 2/2003 | Estepp | 454/229 |
| 7,625,277 | B2 * | 12/2009 | Palmer | 454/255 |
| 7,886,986 | B2 * | 2/2011 | Fischer et al. | 236/49.3 |
| 8,169,330 | B2 * | 5/2012 | Calio et al. | 340/606 |
| 2006/0234621 | A1 * | 10/2006 | Desrochers et al. | 454/239 |
| 2007/0037507 | A1 | 2/2007 | Liu | |
| 2007/0207724 | A1 * | 9/2007 | Coogan | 454/238 |
| 2008/0188173 | A1 | 8/2008 | Chen et al. | |
| 2009/0247064 | A1 | 10/2009 | Chen | |
| 2013/0109291 | A1 * | 5/2013 | Holtz et al. | 454/187 |

FOREIGN PATENT DOCUMENTS

JP    2007 263548 A    10/2007

OTHER PUBLICATIONS

"Natural Ventilation for the Prevention of Airborne Contagion", Escombe et al, Feb. 27, 2007, 10.1371/journal.pmed.0040068.*

* cited by examiner

*Primary Examiner* — Michael D Masinick
(74) *Attorney, Agent, or Firm* — Oblon, McClelland, Maier & Neustadt, L.L.P.

(57) ABSTRACT

A controller for dynamically balancing air pressure in a building including at least a first room, includes a receiver, a processor, and a transmitter. The receiver is configured to receive an outdoor air pressure measured by an outdoor pressure sensor, and to receive a room air pressure measured by a room pressure sensor. The processor is configured to calculate a pressure set point based on the outdoor air pressure, to determine whether the room air pressure deviates from the pressure set point by a predefined threshold, and to generate instructions for a heating ventilation and air conditioning (HVAC) unit to adjust the room air pressure to the first pressure set point. The transmitter is configured to transmit the instructions to the HVAC unit. A system and a process for dynamically balancing air pressure in a building including at least a first room are also provided.

17 Claims, 8 Drawing Sheets

DYNAMIC BUILDING AIR BALANCING USING BAROMETRIC PRESSURE

BACKGROUND

I. Field of the Disclosure

This disclosure relates generally to the control and operation of heating ventilation and air conditioning (HVAC) systems.

II. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In a building, air within separate areas of the building is often maintained via separate heating ventilation and air conditioning (HVAC) units. Each HVAC unit supplies and exhausts the air from an area in the building. The supply air or make-up air is composed of fresh air drawn from outside the building and return air taken from within the area. The fresh air must be conditioned to provide the area with air at the correct temperature. For example, when the outside air temperature is colder than a desired air temperature, the fresh air must be heated. Conversely, when the outside air is warmer than the desired air temperature, the fresh air must be cooled. Conditioning the fresh air requires additional energy resulting in an increased cost of running the HVAC system. Therefore, to reduce the cost of operating the HVAC system, when a large temperature differential exists between the fresh air and the desired air, the HVAC system may decrease the ratio of fresh air to return air. By contrast, when there is a small temperature differential between the fresh air and the desired air, the HVAC system may take advantage of "free heating or cooling" and increase the ratio of fresh air to return air.

SUMMARY

When the fresh air to return air ratio is adjusted, however, an air pressure within an area being maintained by the HVAC system changes. The air pressure may also be affected by the opening and closing of doors to the area, the clogging of air filters within the HVAC system, and any number of other factors. Therefore, a solution to dynamically balance air pressure within areas of the building would be particularly advantageous.

This disclosure addresses dynamically maintaining areas of a building at a positive or negative pressure with respect to other areas of the building. Dynamic pressure balancing helps to prevent particulates in the air of one area from reaching another area in the building, so that air from a negatively pressurized area may be prevented from reaching a positively pressurized area. Such a system is specifically advantageous for a building that utilizes different areas for different purposes. For example, in a manufacturing facility it is desirable to prevent air particulates from reaching "clean" environments. Air from welding or press areas containing various particulates, for instance, could adversely affect a product if the particulates reach product assembly or paint areas. In such a building, positively pressurizing the areas of the building with respect to the outdoor environment, may also prevent dust and other particulates from entering into the building from the outside.

In particular, this disclosure identifies a solution to help prevent air particulates from one area from reaching another area of a building in real-time, while also achieving a specified number of air changes per hour to maintain proper air quality. This disclosure also identifies a solution to dynamically balance air pressure in the building while conserving energy, which is particularly advantageous during weekend or other non-peak times of building operation, when a lower number of air changes may be necessary.

In one aspect of the disclosure, a controller for dynamically balancing air pressure in a building that includes at least a first room, includes a receiver, a processor, and a transmitter. The receiver is configured to receive an outdoor air pressure measured by an outdoor pressure sensor outside of the building, and to receive a first room air pressure measured by a room pressure sensor inside the first room. The processor is configured to calculate a first pressure set point for the first room based on the outdoor air pressure, to determine whether the first room air pressure deviates from the first pressure set point by a predefined threshold, and to generate instructions for a first heating ventilation and air conditioning (HVAC) unit of the first room to adjust the first room air pressure to the first pressure set point. The transmitter is configured to transmit the instructions to the first HVAC unit.

The building may include a second room, and the second room includes a second HVAC unit and a room pressure sensor to measure a second room air pressure inside the second room. The receiver is configured to receive the second room air pressure measured by the room air pressure sensor of the second room. The processor is configured to calculate the first pressure set point and a second pressure set point for the second room based on the measured outdoor and first and second room air pressures, to determine whether the first and second room air pressures deviate from the respective first and second pressure set points by the predefined threshold, and to generate instructions for the first and second HVAC units to adjust the first and second room air pressures to the respective first and second pressure set points and to maintain a predefined pressure differential between the first and second rooms. The transmitter is configured to transmit the instructions to the first and second HVAC units.

The processor is configured to generate the instructions for the HVAC units to maintain the predefined pressure differential between the first and second rooms to conserve power usage by generating instructions which reduce fan speeds of the HVAC units proportionally between the first and second rooms.

The processor is configured to calculate the first and second pressure set points to maintain a predefined pressure differential between the first room and the outdoor air pressure and a predefined pressure differential between the second room and the outdoor air pressure. The first and second pressure set points are higher than the outdoor air pressure.

At least one of the first and second rooms includes two zones, and the two zones are separated from but not pressure sealed from one another. The HVAC unit and room pressure sensor for the one of the first and second rooms include a respective zone HVAC unit and a zone pressure sensor for each of the two zones. The receiver is configured to receive first and second zone air pressures from the zone pressure sensors. The processor is configured to calculate first and second zone pressure set points for the two zones based on the measured outdoor and first and second zone air pressures, to determine whether the first and second zone air pressures deviate from the respective first and second zone pressure set points by the predefined threshold, and to generate instructions for the first and second zone HVAC units to adjust the first and second zone air pressures to the respective first and second zone pressure set points. The transmitter is configured to transmit the instructions to the first and second zone HVAC units.

The receiver is configured to receive a signal from the first HVAC unit indicating a fan speed of a supply fan of the first HVAC unit and of an exhaust fan of the first HVAC unit. The processor is configured to determine whether the supply fan and the exhaust fan are at full capacity.

The processor is configured to determine that the first room air pressure is below the first pressure set point by the predefined threshold, and to generate instructions which increase the fan speed of the supply fan to increase a rate of fresh air supplied to the first room when the supply fan is not at the full capacity, and to reduce the fan speed of the exhaust fan to reduce a rate of exhaust air exhausted from the first room when the supply fan is at the full capacity. The processor is configured to determine that the first room air pressure is above the first pressure set point by the predefined threshold, and to generate instructions which reduce the fan speed of the supply fan to reduce the rate of fresh air supplied to the first room when the exhaust fan is at the full capacity, and to increase the fan speed of the exhaust fan to increase the rate of exhaust air exhausted from the first room when the exhaust fan is not at the full capacity.

The first HVAC unit includes a supply fan drive and an exhaust fan drive. The transmitter is configured to transmit the instructions to increase or reduce the fan speed of the supply fan to the supply fan drive, and to transmit the instructions to increase or reduce the fan speed of the exhaust fan to the exhaust fan drive.

The building may include at least four rooms. The four rooms include a weld shop, a press shop, an assembly shop, and a paint shop. The processor is configured to calculate a pressure set point for each of the weld shop, the press shop, the assembly shop, and the paint shop so that the calculated pressure set point increases from shop to shop in this listed order.

The processor is configured to generate the instructions to correct for a real-time change in the first room air pressure. The real-time change is detected by the room pressure sensor inside the first room from at least one of events including adjustment of a ratio of fresh air to return air supplied to the first room, adjustment of a rate of exhaust air exhausted from the first room, opening and closing of an area opening to the first room, clogging of an air filter of the first HVAC unit, and temperature change in the first room.

Another aspect of the disclosure is a system for dynamically balancing air pressure in a building that includes a first room. The system includes an outdoor pressure sensor, a room pressure sensor, a first heating ventilation and air conditioning (HVAC) unit of the first room, and a first controller. The outdoor pressure sensor measures an outdoor air pressure outside of the building. The room pressure sensor measures a first room air pressure inside the first room. The first controller includes a first receiver, a first processor, and a first transmitter. The first receiver is configured to receive the outdoor air pressure measured by the outdoor pressure sensor and the first room air pressure measured by the room pressure sensor. The first processor is configured to calculate a first pressure set point for the first room based on the outdoor air pressure, to determine whether the first room air pressure deviates from the first pressure set point by a predefined threshold, and to generate instructions for the first HVAC unit to adjust the first room air pressure to the first pressure set point. The first transmitter is configured to transmit the instructions to the first HVAC unit.

The first HVAC unit of the system includes a supply fan, an exhaust fan, a supply variable frequency drive controlling the supply fan, and an exhaust variable frequency drive controlling the exhaust fan.

The system further includes a second controller including a second receiver, a second processor, and a second transmitter. The second receiver is configured to receive the first room air pressure measured by the room pressure sensor. The second transmitter is configured to transmit the first room air pressure to the first receiver. The second receiver is configured to receive the first pressure set point calculated by the first processor. The second processor is configured to determine whether the first room air pressure deviates from the first pressure set point by the predefined threshold, and to generate instructions for the supply and the exhaust variable frequency drives to adjust the first room air pressure to the first pressure set point. The second transmitter is configured to transmit the instructions for the supply and the exhaust variable frequency drives to the first HVAC unit.

Another aspect of the disclosure is a process for dynamically balancing air pressure in a building by a controller. The building includes a first room, a first heating ventilation and air conditioning (HVAC) unit for the first room, a room pressure sensor for the first room, and an outdoor pressure sensor. The process includes receiving an outdoor air pressure measured by the outdoor pressure sensor and a first room air pressure measured by the room pressure sensor. The process further includes calculating a first pressure set point for the first room based on the received outdoor air pressure received by the receiver. The process further includes determining whether the first room air pressure deviates from the first pressure set point by a predefined threshold. The process further includes generating instructions for the first HVAC unit to adjust the first room air pressure to the first pressure set point. The process further includes transmitting the instructions to the first HVAC unit.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and the attendant advantages thereof will be better understood by reference to the accompanying drawings and the subsequent detailed description, where.

DETAILED DESCRIPTION OF THE ILLUSTRATIVE EMBODIMENTS

Figure 1:
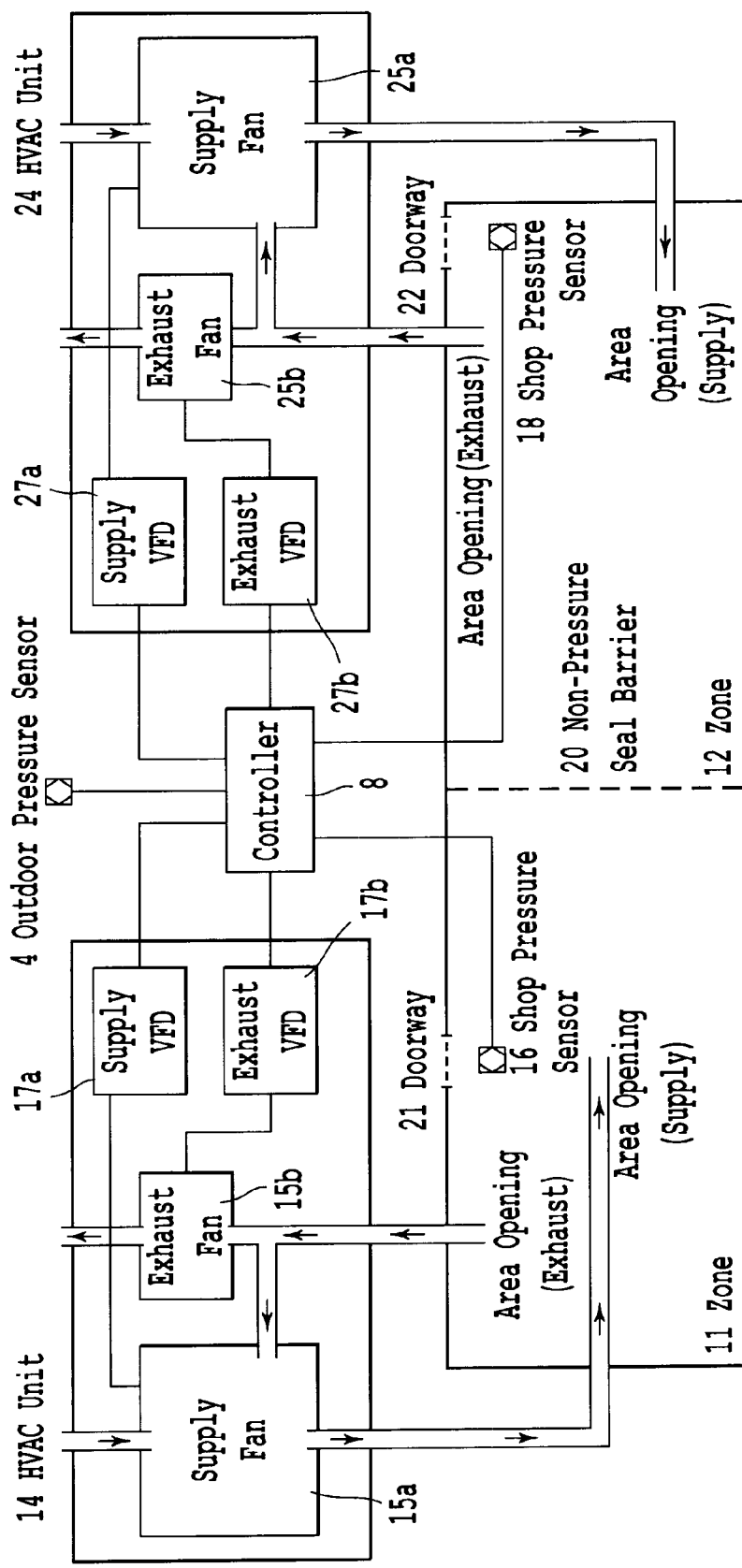
FIG. 1 is a schematic view of an illustrative system for dynamically balancing air pressure in an illustrative room of a building.

Referring to the drawings, like reference numerals designate identical or corresponding parts throughout the several views.

FIG. 1 depicts an illustrative shop 10 of a building. Shop 10 is a weld shop, a press shop, an assembly shop, a paint shop, or any other type of area or room in the building. Shop 10 is composed of one or more zones, and two such zones, zone 11 and zone 12, are illustrated in FIG. 1. Each zone is separated by one or more barriers that do not serve as a pressure seal between adjacent zones. In FIG. 1, a non-pressure seal barrier 20 is illustrated between zone 11 and zone 12.

An HVAC unit 14 supplies and exhausts air to and from zone 11 and an HVAC unit 24 supplies and exhausts air to and from zone 12. Accordingly, HVAC units 14 and 24 maintain a pressure within each of the zones 11 and 12, and the shop 10.

Zones 11 and 12 contain shop pressure sensors 16 and 18, respectively. Any number of shop pressure sensors, however, may be located in shop 10. Shop pressure sensors 16 and 18 are barometric pressure transducers or any other pressure sensors known in the art. Shop pressure sensor 16 is located near a doorway 21 and shop pressure sensor 18 is located near doorway 22. Pressure sensors may also be located anywhere around the shop 10. It is advantageous to provide the pressure sensors near area openings, such as duct inlets and outlets, doorways, and any other openings to the outside of the shop 10 or to an outside of the building, to better detect real-time changes in air pressure from air supplied to and exhausted from these area openings. The area openings include doorways being approximately 30 ft×20 ft, or the area openings may be of any size.

The shop pressure sensors 16 and 18 communicate with a controller 8 for dynamically balancing air pressure in shop 10. The controller 8 is a programmable logic controller or any other controller known in the art. An outdoor pressure sensor 4 also communicates with controller 8. However, any number of outdoor pressure sensors may be located outside of the building and communicate with controller 8.

Controller 8 is connected to variable frequency drives (VFDs) of the respective HVAC units 14 and 24, which control a fan speed of one or more fans of the HVAC units. HVAC unit 14 includes supply fan 15a controlled by a supply VFD 17a and exhaust fan 15b controlled by an exhaust VFD 17b. Similarly, HVAC unit 24 includes supply fan 25a controlled by a supply VFD 27a and exhaust fan 25b controlled by an exhaust VFD 27b. The HVAC units 14 and 24 each further include one or more ducts and valves that assist in controlling air supplied and exhausted to and from the shop 10 and the zones 11 and 12, and in controlling air flows created by the supply and exhaust fans.

Controller 8 continuously receives air pressure measurements in real-time, which are continuously made by the outdoor pressure sensor 4 and the shop pressure sensors 16 and 18. The outdoor pressure sensor 4 and the shop pressure sensors 16 and 18 may also make individual measurements separated by any specified time period, and the controller 8 may receive these measurements at any given time period. Controller 8 performs a calculation, based on the measured outdoor air pressure, to calculate a pressure set point for the shop 10, and more particularly, for each of the zones 11 and 12 in the shop 10. The calculated pressure set point for a shop is the same or different from the calculated pressure set point for each of the zones in the shop. The calculated pressure set point for one zone in a shop is the same or different from the calculated pressure set point of another zone in the shop. Controller 8 then determines one or more signals to send to HVAC units 14 and 24, and specifically to VFDs 17a, 17b, 27a, and 27b, in order to maintain shop 10, and zones 11 and 12, each at the respective calculated pressure set point.

As pressure sensors 4, 16, and 18, continuously measure the air pressure within their respective areas and send these measured air pressures to controller 8, the controller dynamically controls HVAC units 14 and 24, and specifically VFDs 17a, 17b, 27a, and 27b, to maintain shop 10, and zones 11 and 12, each at the respective calculated pressure set point.

In another aspect of the disclosure, a system for dynamically balancing air pressure in a building includes the outdoor pressure sensor 4, the shop pressure sensor 16 or 18, the HVAC unit 14 or 24, and the controller 8.

In a non-limiting example of operation, shop pressure sensors 16 and 18 continuously send their respective measured shop air pressure to controller 8, and the controller calculates a respective pressure set point for shop 10, and for zones 11 and 12, based on the measured outdoor air pressure by outdoor pressure sensor 4. The calculation is specifically based on the most recently received measured outdoor air pressure. The calculation may also be an algorithm that uses predetermined pressure differentials between the measured outside air pressure and the measured shop air pressure to calculate the respective pressure set point for the shop 10, and for the zones 11 and 12. After the pressure set point calculation, controller 8 determines one or more signals to send to HVAC units 14 and 24 to adjust a speed of supply fans 15a and 25a and/or exhaust fans 15b and 25b through VFDs 17a and 27a and/or 17b and 27b, respectively, in order to maintain shop 10, and zones 11 and 12, each at the respective calculated pressure set point.

Furthermore, if doorway 21 is opened to the outside of shop 10, shop pressure sensor 16 detects a difference in air pressure in real-time, as compared to before doorway 21 was opened. The controller 8 then detects a deviation between the measured shop air pressure received from shop pressure sensor 16 and the calculated pressure set point for the zone 11. Controller 8 then determines one or more signals to vary the speed of supply fan 15a and/or exhaust fan 15b through VFDs 17a and 17b, in order to maintain zone 11 at the calculated pressure set point for the zone. Moreover, if outdoor pressure sensor 4 detects a deviation in the measured outdoor air pressure, controller 8 calculates a new pressure set point for shop 10, and for zones 11 and 12, and determines one or more signals to control VFDs 17a, 17b, 27a, and 27b of HVAC units 14 and 24, to maintain the shop and zones each at the respective new calculated pressure set point.

Figure 2A:
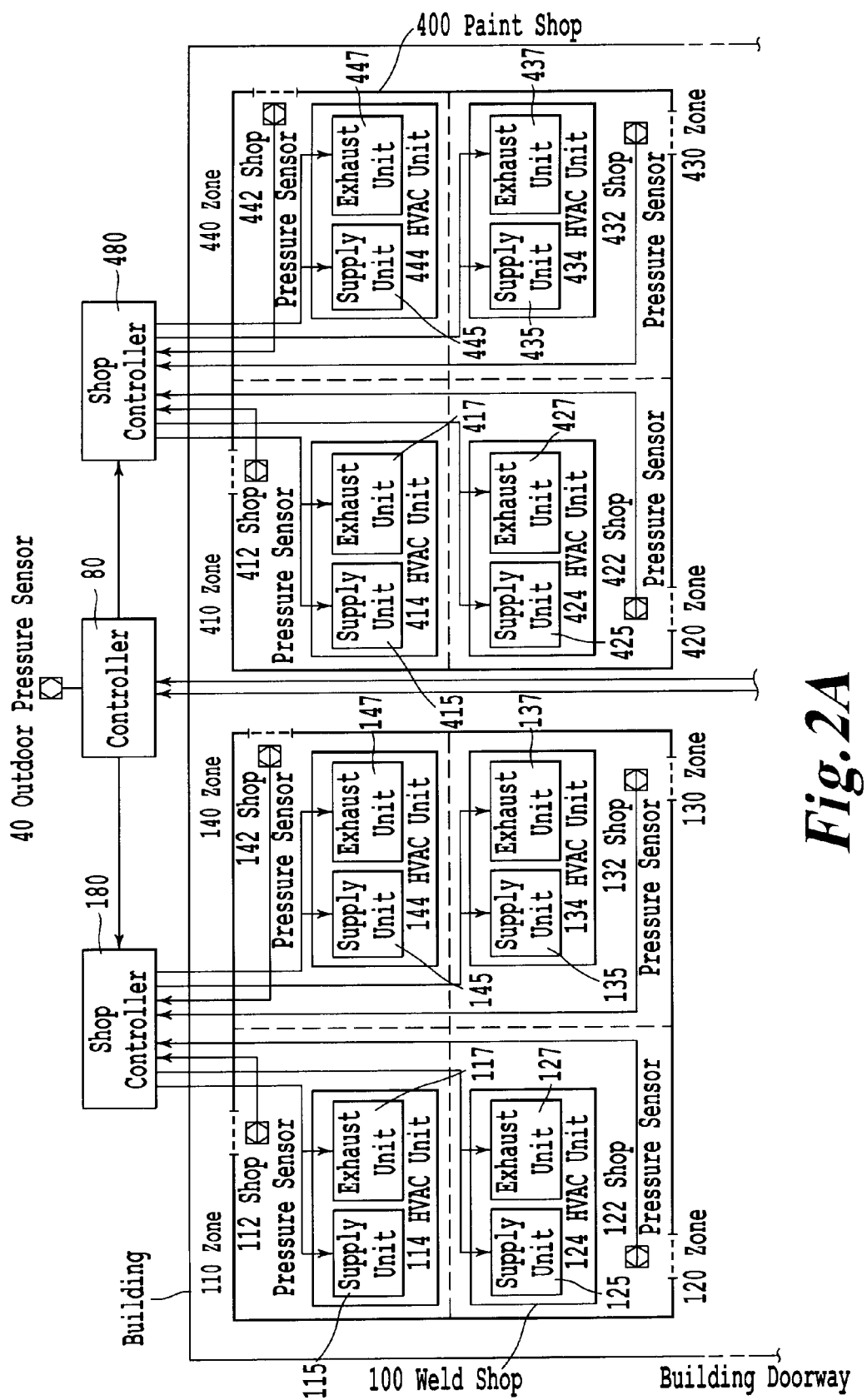
FIGS. 2A and 2B are schematic views of an illustrative system for dynamically balancing air pressure in illustrative rooms of a building.
Figure 2B:
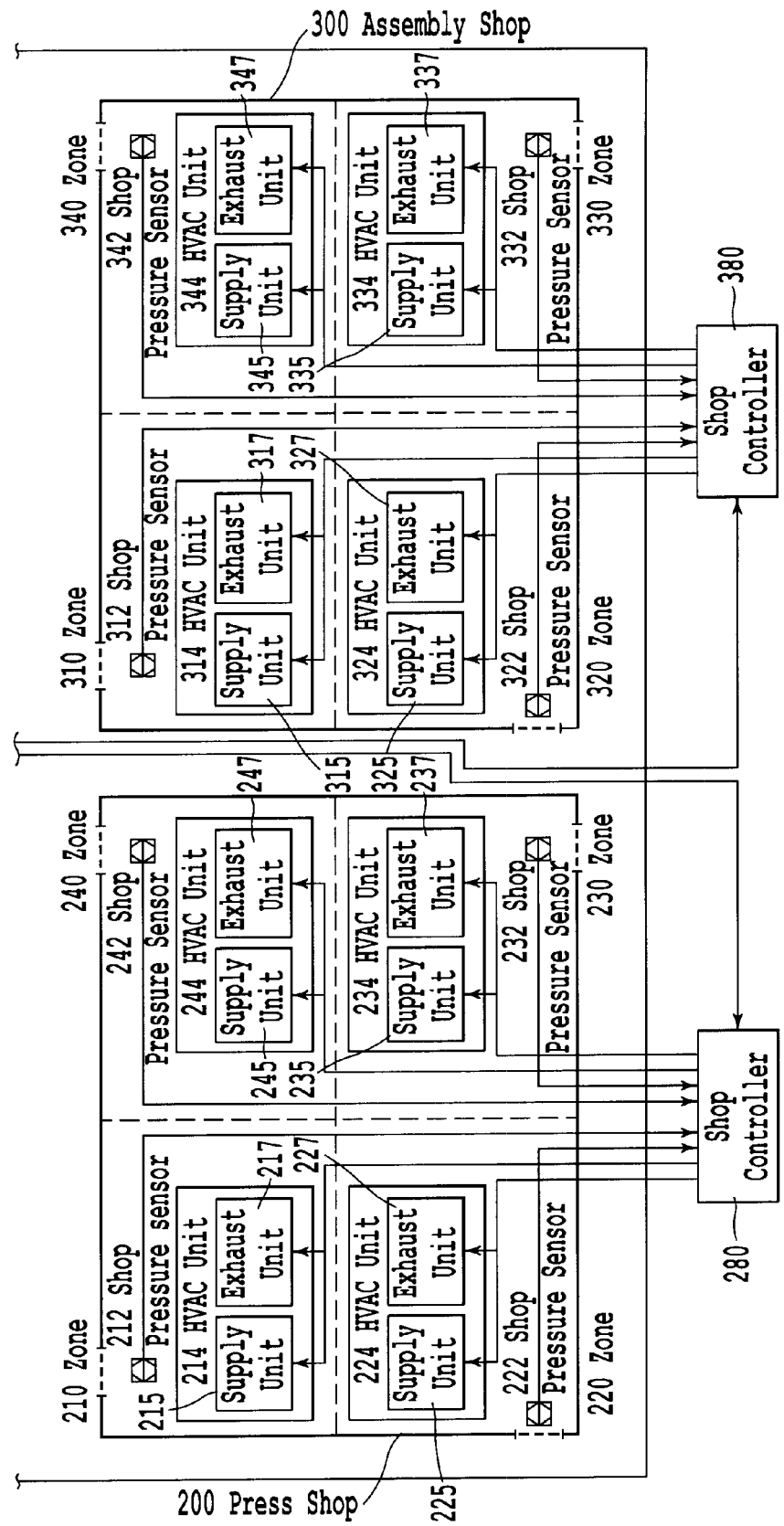

FIGS. 2A and 2B depict an illustrative building. The building is an automobile manufacturing plant that is approximately 3.5 million ft$^2$, or may be any other type of building of any size. The building is composed of one or more shops, and four illustrative shops, shop 100, shop 200, shop 300, and shop 400, are shown in FIGS. 2A and 2B. Shops 100, 200, 300, and 400 are a weld shop, a press shop, an assembly shop, and a paint shop, respectively, or any other types of areas or rooms in the building. Each shop is pressure sealed from the other shops by walls or other structures in the building. Each shop further includes one or more area openings such as doorways, similar to those illustrated in FIG. 1. The building also includes one or more area openings, such as the illustrative building doorway in FIG. 2A.

Shops 100, 200, 300, and 400 are each composed of one or more zones, and in FIGS. 2A and 2B, each shop is illustrated with four such zones. Shop 100 thus includes zone 110, zone 120, zone 130, and zone 140; shop 200 includes zone 210, zone 220, zone 230, and zone 240; shop 300 includes zone 310, zone 320, zone 330, and zone 340; and shop 400 includes zone 410, zone 420, zone 430, and zone 440. Each zone is separated by one or more barriers that do not serve as pressure seals between adjacent zones, similar to barrier 20 illustrated in FIG. 1.

Controller 80 for dynamically balancing air pressure controls and maintains air pressure differentials between the shops 100, 200, 300, and 400 and with respect to the outdoor air pressure. The controller 80 also controls and maintains the air pressure of each of the zones within the shops 100, 200, 300, and 400.

HVAC units supply and exhaust air to and from each of the shops 100, 200, 300, and 400. One or more HVAC units are provided for each shop, and each HVAC unit supplies and exhausts air to and from a zone within each shop. As FIGS. 2A and 2B illustrate, in shop 100, HVAC unit 114 supplies and exhausts air to and from zone 110, HVAC unit 124 supplies and exhausts air to and from zone 120, HVAC unit 134 supplies and exhausts air to and from zone 130, and HVAC unit 144 supplies and exhausts air to and from zone 140. Similarly, in shop 200, HVAC unit 214 supplies and exhausts air to and from zone 210, HVAC unit 224 supplies and exhausts air to and from zone 220, HVAC unit 234 supplies and exhausts air to and from zone 230, and HVAC unit 244 supplies and exhausts air to and from zone 240; in shop 300, HVAC unit 314 supplies and exhausts air to and from zone 310, HVAC unit 324 supplies and exhausts air to and from zone 320, HVAC unit 334 supplies and exhausts air to and from zone 330, and HVAC unit 344 supplies and exhausts air to and from zone 340; and in shop 400, HVAC unit 414 supplies and exhausts air to and from zone 410, HVAC unit 424 supplies and exhausts air to and from zone 420, HVAC unit 434 supplies and exhausts air to and from zone 430, and HVAC unit 444 supplies and exhausts air to and from zone 440.

The HVAC units within each shop each contain a supply unit and an exhaust unit. As FIGS. 2A and 2B illustrate, in shop 100, HVAC unit 114 includes supply unit 115 and exhaust unit 117, HVAC unit 124 includes supply unit 125 and exhaust unit 127, HVAC unit 134 includes supply unit 135 and exhaust unit 137, and HVAC unit 144 includes supply unit 145 and exhaust unit 147. Similarly, in shop 200, HVAC unit 214 includes supply unit 215 and exhaust unit 217, HVAC unit 224 includes supply unit 225 and exhaust unit 227, HVAC unit 234 includes supply unit 235 and exhaust unit 237, and HVAC unit 244 includes supply unit 245 and exhaust unit 247; in shop 300, HVAC unit 314 includes supply unit 315 and exhaust unit 317, HVAC unit 324 includes supply unit 325 and exhaust unit 327, HVAC unit 334 includes supply unit 335 and exhaust unit 337, and HVAC unit 344 includes supply unit 345 and exhaust unit 347; and in shop 400, HVAC unit 414 includes supply unit 415 and exhaust unit 417, HVAC unit 424 includes supply unit 425 and exhaust unit 427, HVAC unit 434 includes supply unit 435 and exhaust unit 437, and HVAC unit 444 includes supply unit 445 and exhaust unit 447.

In the HVAC units, each supply unit includes a supply variable frequency drive (VFD) and a supply fan, similar to supply VFD 17a and supply fan 15a illustrated in FIG. 1, and each exhaust unit includes an exhaust VFD and an exhaust fan, similar to exhaust VFD 17b and exhaust fan 15b illustrated in FIG. 1. A supply fan is a 50 to 100 horsepower fan and an exhaust fan is a 5 to 7.5 horsepower fan, or the supply and exhaust fans may each be of any required power rating. Further detail of an illustrative HVAC unit is depicted in FIG. 1.

Each of the shops 100, 200, 300, and 400 includes any number of shop pressure sensors. As FIGS. 2A and 2B illustrate, in shop 100, zone 110 includes shop pressure sensor 112, zone 120 includes shop pressure sensor 122, zone 130 includes shop pressure sensor 132, and zone 140 includes shop pressure sensor 142. Similarly, in shop 200, zone 210 includes shop pressure sensor 212, zone 220 includes shop pressure sensor 222, zone 230 includes shop pressure sensor 232, and zone 240 includes shop pressure sensor 242; in shop 300, zone 310 includes shop pressure sensor 312, zone 320 includes shop pressure sensor 322, zone 330 includes shop pressure sensor 332, and zone 340 includes shop pressure sensor 342; and in shop 400 includes shop pressure sensor 412, zone 410 includes shop pressure sensor 412, zone 420 includes shop pressure sensor 422, zone 430 includes shop pressure sensor 432, and zone 440 includes shop pressure sensor 442.

The shop pressure sensors communicate with a controller 80. An outdoor pressure sensor 40 also communicates with the controller 80. However, any number of outdoor pressure sensors may be located outside of the building and communicate with controller 80. The controller 80 continuously receives air pressure measurements in real-time, which are continuously made by the outdoor the shop pressure sensors. The outdoor and the shop pressure sensors may also make individual measurements separated by any specified time period, and the controller 80 may receive these measurements at any given time period.

In another aspect of the disclosure, a controller for each respective shop in the building is provided. As with controller 8, the controller 80 and the shop controllers are each programmable logic controllers or any other controllers known in the art. As illustrated in FIGS. 2A and 2B, the building includes shop controller 180, shop controller 280, shop controller 380, and shop controller 480. The shop controllers 180, 280, 380, and 480 serve as intermediary controllers between the controller 80, and the shop pressure sensors and the shop HVAC units. The shop controllers 180, 280, 380, and 480 continuously receive the measured shop air pressures directly from the respective shop pressure sensors, and continuously receive the measured outdoor air pressure from the controller 80 or directly from the outdoor pressure sensor 40. The shop controllers 180, 280, 380, and 480 directly control the respective shop HVAC units in an illustrative example.

The controller 80 and/or the shop controllers 180, 280, 380, and 480 are connected to the supply and exhaust VFDs of the respective shop HVAC units, to control a fan speed of supply and exhaust fans of the HVAC units.

Controller 80 and/or shop controllers 180, 280, 380, and 480 perform a calculation, based on the measured outdoor air pressure, to calculate a pressure set point for each of the shops 100, 200, 300, and 400 and the zones within the shops. Controller 80 and/or shop controllers 180, 280, 380, and 480 then determine one or more signals to send to the respective HVAC units, and specifically to the supply and exhaust VFDs, in order to maintain shops 100, 200, 300, and 400 and the zones within the shops each at the respective calculated pressure set point.

In a non-limiting example of operation, the shop pressure sensors detect a difference in air pressure in any of the shops 100, 200, 300, and 400 and the zones within the shops in real-time. A real-time change in shop air pressure inside any shop results from events including adjustment of a fresh air to return air ratio of air supplied to the shop, adjustment of exhaust air exhausted from the shop, opening and closing of an area opening to the shop or to the building, clogging of an air filter of the shop HVAC unit, and temperature change in the shop, or any other event altering the air pressure in the shop. Adjustment of the fresh air to return air ratio of air supplied to the shop and of the exhaust air exhausted from the shop, is made by the controller 80 and/or the shop controllers 180, 280, 380, and 480, for instance, to take advantage of "free heating and cooling" based on the temperature outside the building.

Outdoor pressure sensor 40 and the shop pressure sensors in the building continuously send the measured outdoor and shop air pressures to controller 80 and/or to the shop controllers 180, 280, 380, and 480. The controller 80 and/or the shop controllers 180, 280, 380, and 480 calculate a respective pressure set point for each shop and for zones within the shops, based on the measured outdoor air pressure. The calculation is specifically based on the most recently received measured outdoor air pressure. The calculation may also be an algorithm that uses predetermined pressure differentials between the measured outside air pressure and the measured shop air pressures to calculate the pressure set point for each of the shops 100, 200, 300, and 400, and for the zones within each shop. After the pressure set point calculation, controller 80 and/or the shop controllers 180, 280, 380, and 480 determine one or more signals to send to the respective HVAC units to adjust the speed of the supply fans and/or exhaust fans through the supply and exhaust VFDs, to maintain each of the shops 100, 200, 300, and 400, and the zones within each shop at the respective calculated pressure set point.

Following a real-time change in air pressure in a shop, controller 80 and/or a respective shop controller detects a deviation between the measured shop air pressure from a respective shop pressure sensor and the calculated pressure set point for the shop. Controller 80 and/or the respective shop controller then determines one or more signals to vary a speed of a supply fan and/or an exhaust fan through a supply VFD and/or an exhaust VFD, in order to maintain the shop at the calculated pressure set point. Moreover, if pressure sensor 40 detects a deviation in the measured outdoor air pressure, controller 80 and/or the shop controllers 180, 280, 380, and 480 calculate a new pressure set point for each shop and for the zones within the shops, and determine one or more signals to control the VFDs of the HVAC units, to maintain each of the shops 100, 200, 300, and 400 and the zones within the shops at the respective new calculated pressure set point.

In a non-limiting example of operation, controller 80 and/or shop controllers 180, 280, 380, and 480 use predetermined pressure differentials to calculate the pressure set point for each shop and the zones within each shop, to maintain the shops at a positive pressure relative to the measured outdoor air pressure. Such a configuration controls the flow of dust and particulates that may be airborne, and helps prevent the dust and particulates from the outdoors from entering any shop in the building. In particular, it may be necessary to open an area opening to the outside of the building, such as the building doorway in FIG. 2A, to transport products from the building. Thus, this configuration helps prevent dust and particulates from the outdoors from entering any shop in the building, even when large area openings are opened for extended periods of time.

In a non-limiting example of operation, shop 100 as a weld shop is maintained at a positive pressure relative to the measured air pressure outside of the building, shop 200 as a press shop is maintained at a positive pressure relative to the weld shop, shop 300 as an assembly shop is maintained at a positive pressure relative to the press shop, and shop 400 as a paint shop is maintained at a positive pressure relative to the assembly shop. For instance, maintaining shop 400, the paint shop, at the highest relative pressure ensures that a lowest number of particulates reach the paint shop, compared to the other shops. Such a configuration helps prevent particulates from the weld shop and the press shop, where the particulates in the building may be mostly generated, from reaching the assembly shop and the paint shop, where the particulates can be most harmful.

In another aspect of the disclosure, FIGS. 3-6 depict flow charts of illustrative algorithmic processes used in dynamically balancing air pressure in a building, which the illustrative systems of FIGS. 1 and 2A-B may execute. These algorithmic processes are executed by corresponding computerized circuits, which are discussed in detail later.

Figure 3:
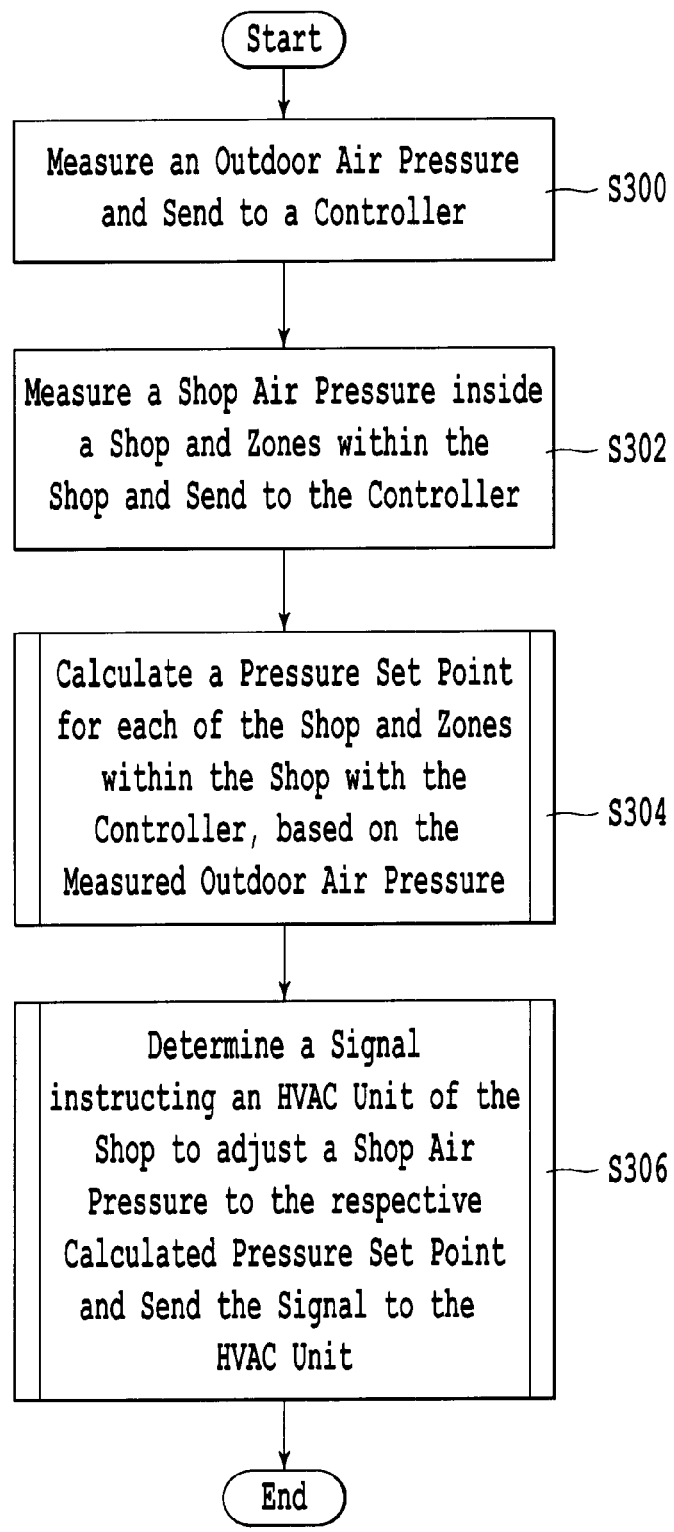
FIG. 3 is a flow chart describing an illustrative process for dynamically balancing air pressure in a building.

From a start in FIG. 3, step S300 includes measuring an outdoor air pressure outside of a building with an outdoor pressure sensor and sending the measured outdoor air pressure to a controller. Step S302 includes measuring a shop air pressure inside a shop and in each zone within the shop and sending the measured shop air pressures to the controller. Step S304, as a predetermined process, includes calculating a pressure set point for the shop and for each zone within the shop with the controller, based on the measured outdoor air pressure. Step S306, as a predetermined process, includes the controller determining a signal to instruct an HVAC unit of the shop to adjust a shop air pressure to a respective calculated pressure set point, and sending the signal to the HVAC unit. The illustrative process in FIG. 3 is then concluded.

Figure 4:
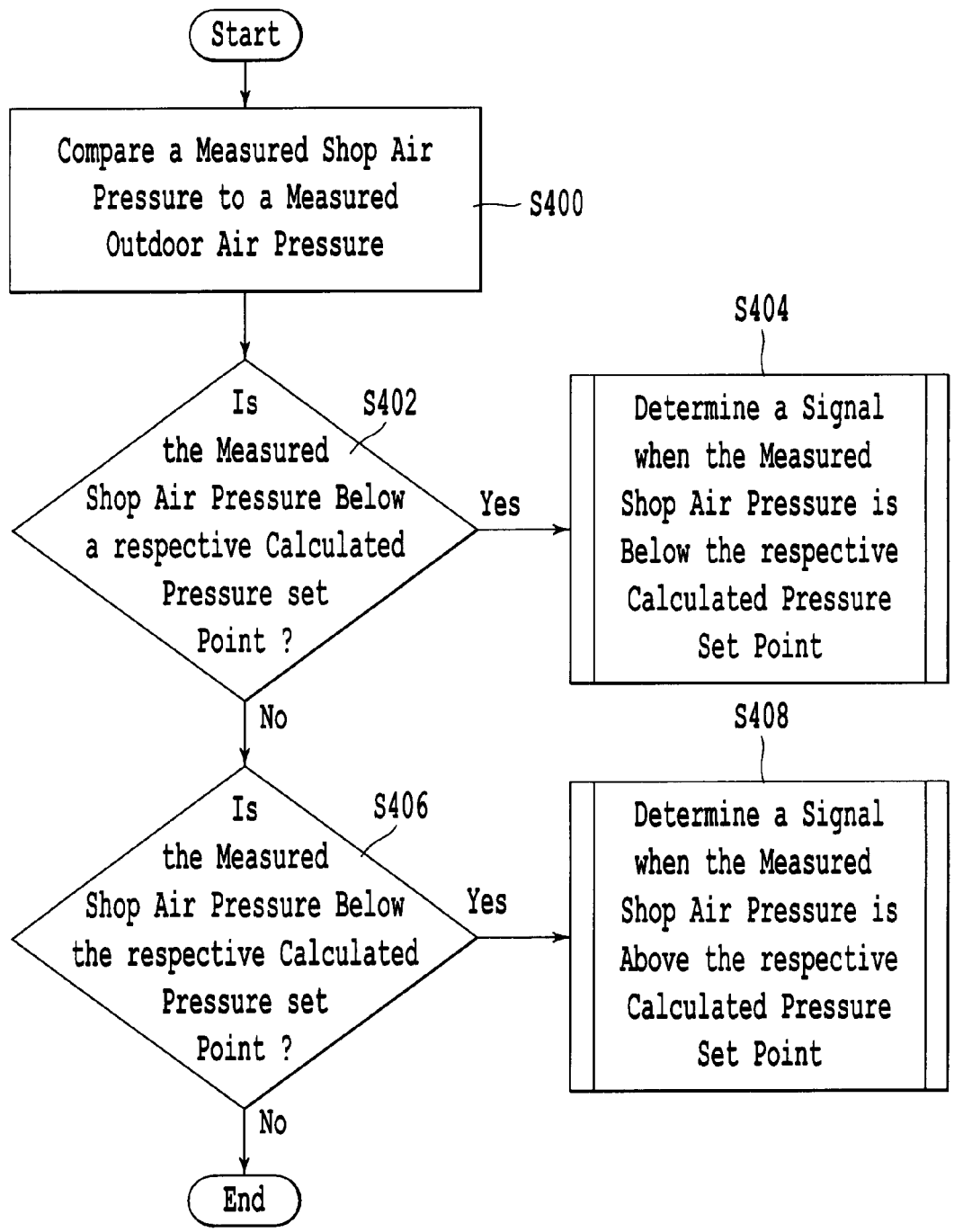
FIG. 4 is a flow chart describing an illustrative process for determining a signal when a measured air pressure is above or below a calculated pressure set point.

From a start in FIG. 4, step S400 includes comparing a measured shop air pressure to a measured outdoor air pressure. Step S402 includes determining whether the measured shop air pressure is below a respective calculated pressure set point. If it is determined that the measured shop air pressure is below the respective calculated pressure set point, the process proceeds to step S404. Step S404, as a predetermined process, includes determining a signal when the measured shop air pressure is below the respective calculated pressure set point. If it is determined that the measured shop air pressure is not below the respective calculated pressure set point, the process proceeds to step S406. Step S406 includes determining whether the measured shop air pressure is above the respective calculated pressure set point. If it is determined that the measured shop air pressure is above the respective calculated pressure set point, the process proceeds to step S408. Step S408, as a predetermined process, includes determining a signal when the measured shop air pressure is above the respective calculated pressure set point. If it is determined that the measured shop air pressure is not above the respective calculated pressure set point, the illustrative process in FIG. 4 is then concluded.

Figure 5:
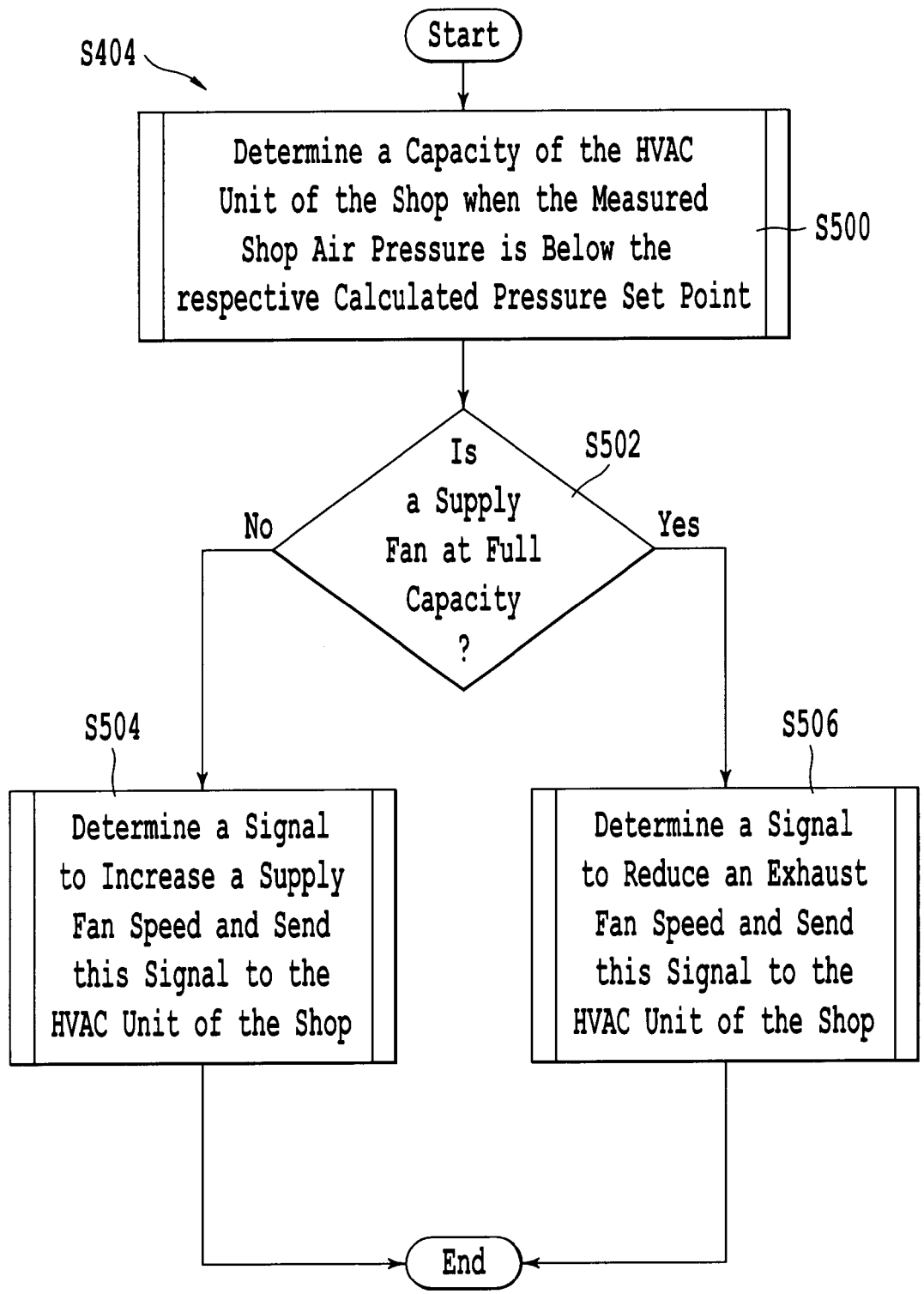
FIG. 5 is a flow chart describing an illustrative process for determining a signal to increase or reduce a fan speed in an HVAC unit and sending the signal to the HVAC unit, when a measured air pressure is below a calculated pressure set point.

From a start in FIG. 5, which may follow from step S404, step S500, as a predetermined process, includes determining a capacity of the HVAC unit of the shop when the measured shop air pressure is below the respective calculated pressure set point. Step S502 includes determining if a supply fan of the HVAC unit is at full capacity. If it is determined that the supply fan is not at full capacity, the process proceeds to step S504. Step S504, as a predetermined process, includes determining a signal to increase a supply fan speed of the supply fan, and sending this signal to the HVAC unit. The illustrative process in FIG. 5 is then concluded. If it is determined that the supply fan is at full capacity, the process proceeds to step S506. Step S506, as a predetermined process, includes determining a signal to reduce an exhaust fan speed of an exhaust fan of the HVAC unit of the shop, and sending this signal to the HVAC unit. The illustrative process in FIG. 5 is then concluded.

Figure 6:
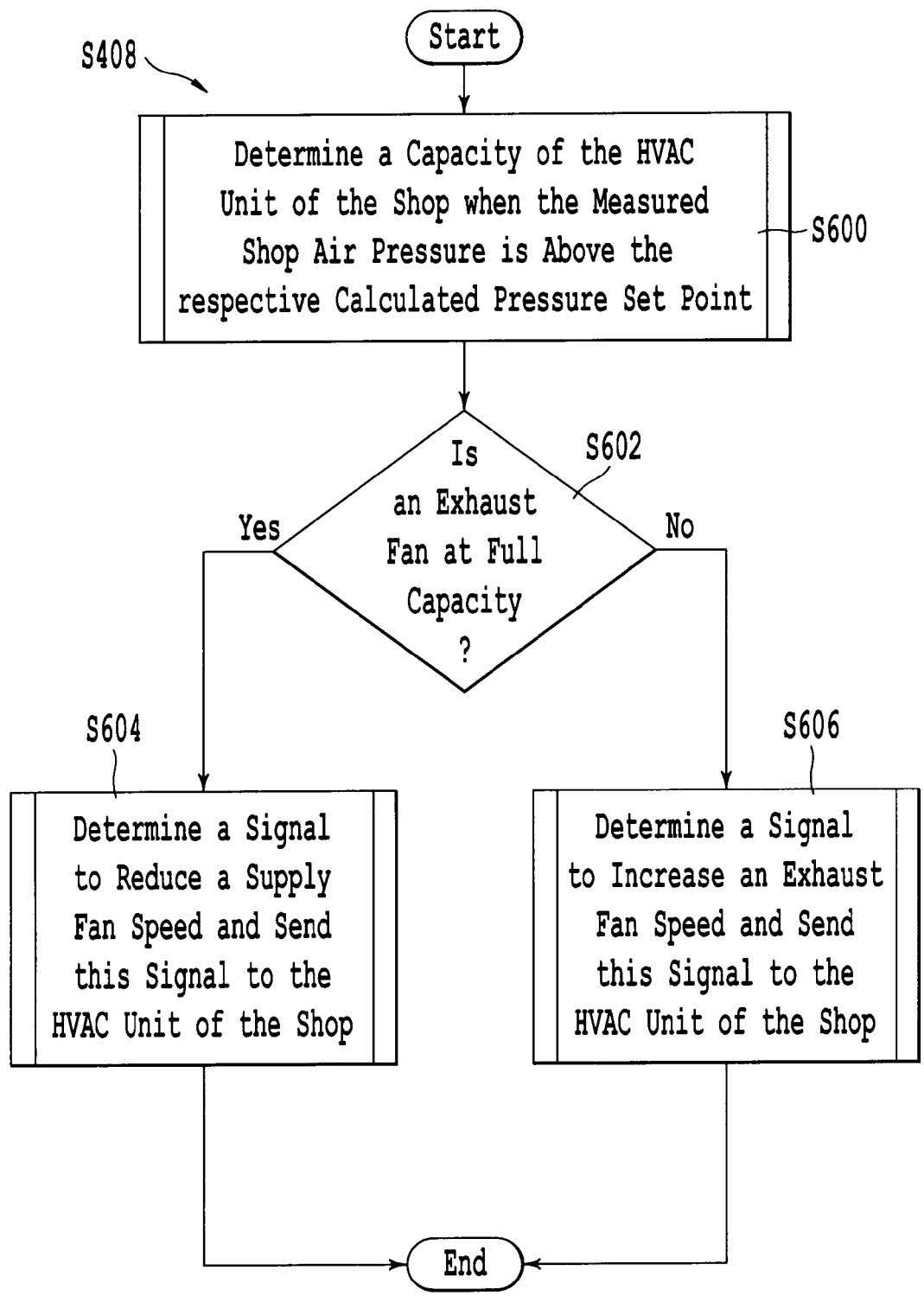
FIG. 6 is a flow chart describing an illustrative process for determining a signal to increase or reduce a fan speed in an HVAC unit and sending the signal to the HVAC unit, when a measured air pressure is above a calculated pressure set point.

From a start in FIG. 6, which may follow from step S408, step S600, as a predetermined process, includes determining a capacity of the HVAC unit of the shop when the measured shop air pressure is above the respective calculated pressure set point. Step S602 includes determining if an exhaust fan of the HVAC unit is at full capacity. If it is determined that the exhaust fan is at full capacity, the process proceeds to step S604. Step S604, as a predetermined process, includes determining a signal to reduce a supply fan speed of a supply fan of the HVAC unit of the shop, and sending this signal to the HVAC unit. The illustrative process in FIG. 6 is then concluded. If it is determined that the exhaust fan is not at full capacity, the process proceeds to step S606. Step S606, as a predetermined process, includes determining a signal to increase an exhaust fan speed of the exhaust fan, and sending this signal to the HVAC unit. The illustrative process in FIG. 6 is then concluded.

Figure 7:
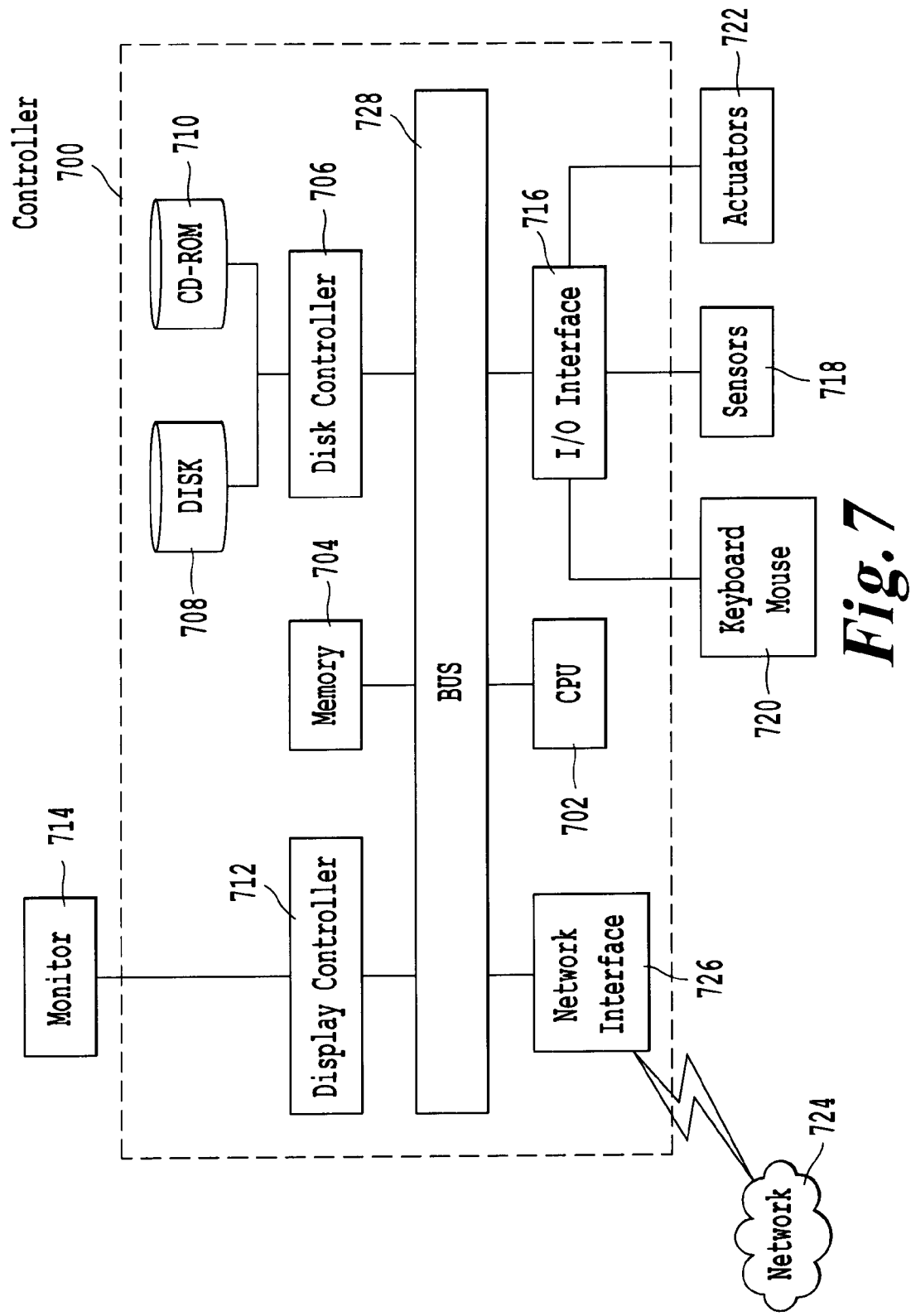
FIG. 7 is a schematic view of a hardware diagram of an illustrative controller for dynamically balancing air pressure in a building.

In another aspect of the disclosure, FIG. 7 depicts an illustrative controller 700 for dynamically balancing air pressure in a building. Controller 700 is an illustrative example of any controller described in this disclosure, including controllers 8, 80, 180, 280, 380, and 480.

As shown in FIG. 7, systems, operations, and processes in accordance with this disclosure are implemented using a microprocessor or its equivalent, such as a central processing unit (CPU) 702 or at least one application specific processor (ASP). The CPU 702 utilizes a computer readable storage medium, such as a memory 704 (e.g., ROM, EPROM, EEPROM, flash memory, static memory, DRAM, SDRAM, and their equivalents), configured to control the CPU 702 to perform and/or control the systems, operations, and processes of this disclosure. Other storage mediums are controlled via a controller, such as a disk controller 706, which controls a hard disk drive 708 or optical disk drive 710.

The CPU 702 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The CPU 702 is a separate device or a single processing mechanism. Further, this disclosure may benefit form parallel processing capabilities of a multi-cored CPU.

In another aspect, results of processing in accordance with this disclosure are displayed via a display controller 712 to a monitor 714 that is peripheral to or part of the controller 700. Moreover, the monitor 714 is provided with a touch-sensitive interface to a command/instruction interface in an illustrative example. The display controller 712 also includes at least one graphic processing unit for improved computational efficiency. Additionally, the controller 700 includes an I/O (input/output) interface 716, provided for inputting sensor data from sensors 718. The sensors 718 are illustrative of any of the outdoor and shop pressure sensors described in this disclosure.

Further, other input devices are connected to the I/O interface 716 as peripherals or as part of the controller 700. For example, a keyboard or a pointing device such as a mouse 720 control parameters of the various processes and algorithms of this disclosure, and are connected to the I/O interface 716 to provide additional functionality and configuration options, or to control display characteristics. Actuators 722 which are embodied in any of the HVAC units described in this disclosure are also connected to the I/O interface 716.

The above-noted hardware components are coupled to a network 724, such as the Internet or a local intranet, via a network interface 726 for the transmission or reception of data, including controllable parameters. A central BUS 728 is provided to connect the above-noted hardware components together, and to provide at least one path for digital communication there between.

The foregoing disclosure describes merely illustrative embodiments of the present invention. As will be understood by those skilled in the art, the present invention may be embodied in other specific forms without departing from the spirit or essential characteristics thereof. Accordingly, the disclosure is intended to be illustrative of the present invention, but not limiting of the scope of the invention, as well as the following claims. The disclosure and any discernible variants of the teachings herein define, at least in part, the scope of the claim terminology, such that no inventive subject matter is dedicated to the public.

The invention claimed is:

1. A controller for dynamically balancing air pressure in a building that includes at least a first room, comprising:
a receiver configured to receive an outdoor air pressure measured by an outdoor pressure sensor outside of the building, and to receive a first room air pressure measured by a room pressure sensor inside the first room;
a processor configured to calculate a first pressure set point for the first room based on the outdoor air pressure, to determine whether the first room air pressure deviates from the first pressure set point by a predefined threshold, and to generate instructions for a first heating ventilation and air conditioning (HVAC) unit of the first room to adjust the first room air pressure to the first pressure set point; and
a transmitter configured to transmit the instructions to the first HVAC unit, wherein
the processor is configured to determine whether a supply fan of the first HVAC unit and an exhaust fan of the first HVAC unit are at full capacity, and to:
determine that the first room air pressure is below the first pressure set point by the predefined threshold, and to generate instructions which increase a fan speed of the supply fan to increase a rate of air supplied to the first room when the supply fan is not at full capacity, and which reduce a fan speed of the exhaust fan to reduce a rate of air exhausted from the first room when the supply fan is at full capacity, or
determine that the first room air pressure is above the first pressure set point by the predefined threshold, and to generate instructions which reduce the fan speed of the supply fan to reduce the rate of air supplied to the first room when the exhaust fan is at full capacity, and which increase the fan speed of the exhaust fan to increase the rate of air exhausted from the first room when the exhaust fan is not at full capacity.

2. The controller according to claim 1, wherein:
the building includes a second room, the second room including a second HVAC unit and a room pressure sensor to measure a second room air pressure inside the second room,
the receiver is configured to receive the second room air pressure measured by the room air pressure sensor of the second room,
the processor is configured to calculate the first pressure set point and a second pressure set point for the second room based on the measured outdoor and first and second room air pressures, to determine whether the first and second room air pressures deviate from the respective first and second pressure set points by the predefined threshold, and to generate instructions for the first and second HVAC units to adjust the first and second room air pressures to the respective first and second pressure set points and to maintain a predefined pressure differential between the first and second rooms, and the transmitter is configured to transmit the instructions to the first and second HVAC units.

3. The controller according to claim 2, wherein:

the processor is configured to generate the instructions for the HVAC units to maintain the predefined pressure differential between the first and second rooms to conserve power usage by generating instructions which reduce fan speeds of the HVAC units proportionally between the first and second rooms.

4. The controller according to claim 3, wherein:

the processor is configured to calculate the first and second pressure set points to maintain a predefined pressure differential between the first room and the outdoor air pressure and a predefined pressure differential between the second room and the outdoor air pressure, the first and second pressure set points being higher than the outdoor air pressure.

5. The controller according to claim 4, wherein:

at least one of the first and second rooms includes two zones, the two zones being separated from but not pressure sealed from one another, the HVAC unit and room pressure sensor for the one of the first and second rooms including a respective zone HVAC unit and a zone pressure sensor for each of the two zones, the receiver is configured to receive first and second zone air pressures from the zone pressure sensors, the processor is configured to calculate first and second zone pressure set points for the two zones based on the measured outdoor and first and second zone air pressures, to determine whether the first and second zone air pressures deviate from the respective first and second zone pressure set points by the predefined threshold, and to generate instructions for the first and second zone HVAC units to adjust the first and second zone air pressures to the respective first and second zone pressure set points, and the transmitter is configured to transmit the instructions to the first and second zone HVAC units.

6. The controller according to claim 1, wherein:

the receiver is configured to receive a signal from the first HVAC unit indicating the fan speed of the supply fan of the first HVAC unit and of the exhaust fan of the first HVAC unit.

7. The controller according to claim 6, wherein:

the processor is configured to determine that the first room air pressure is below the first pressure set point by the predefined threshold, and to generate instructions which increase the fan speed of the supply fan to increase a rate of fresh air supplied to the first room when the supply fan is not at full capacity, and which to reduce the fan speed of the exhaust fan to reduce a rate of exhaust air exhausted from the first room when the supply fan is at full capacity, and the processor is configured to determine that the first room air pressure is above the first pressure set point by the predefined threshold, and to generate instructions which reduce the fan speed of the supply fan to reduce the rate of fresh air supplied to the first room when the exhaust fan is at full capacity, and which increase the fan speed of the exhaust fan to increase the rate of exhaust air exhausted from the first room when the exhaust fan is not at full capacity.

8. The controller according to claim 7, wherein:

the first HVAC unit includes a supply fan drive and an exhaust fan drive, and the transmitter is configured to transmit the instructions to increase or reduce the fan speed of the supply fan to the supply fan drive, and to transmit the instructions to increase or reduce the fan speed of the exhaust fan to the exhaust fan drive.

9. The controller according to claim 1, wherein:

the building includes at least four rooms, the four rooms including a weld shop, a press shop, an assembly shop, and a paint shop, and the processor is configured to calculate a pressure set point for each of the weld shop, the press shop, the assembly shop, and the paint shop so that the calculated pressure set point increases from shop to shop in this listed order.

10. The controller according to claim 1, wherein:

the processor is configured to generate the instructions to correct for a real-time change in the first room air pressure, the real-time change being detected by the room pressure sensor inside the first room from at least one of events including adjustment of a ratio of fresh air to return air supplied to the first room, adjustment of a rate of exhaust air exhausted from the first room, opening and closing of an area opening to the first room, clogging of an air filter of the first HVAC unit, and temperature change in the first room.

11. The controller according to claim 1, wherein the processor is configured to calculate the first pressure set point using only the outdoor air pressure measured by the outdoor pressure sensor and a predefined pressure differential between the first room and the outdoor air.

12. A system for dynamically balancing air pressure in a building that includes a first room, comprising:

an outdoor pressure sensor that measures an outdoor air pressure outside of the building;

a room pressure sensor that measures a first room air pressure inside the first room;

a first heating ventilation and air conditioning (HVAC) unit of the first room; and a first controller including a first receiver, a first processor, and a first transmitter, the first receiver being configured to receive the outdoor air pressure measured by the outdoor pressure sensor and the first room air pressure measured by the room pressure sensor, the first processor being configured to calculate a first pressure set point for the first room based on the outdoor air pressure, to determine whether the first room air pressure deviates from the first pressure set point by a predefined threshold, and to generate instructions for the first HVAC unit to adjust the first room air pressure to the first pressure set point, and the first transmitter being configured to transmit the instructions to the first HVAC unit, wherein the first processor is configured to determine whether a supply fan of the first HVAC unit and an exhaust fan of the first HVAC unit are at full capacity, and to:

determine that the first room air pressure is below the first pressure set point by the predefined threshold, and to generate instructions which increase a fan speed of the supply fan to increase a rate of air supplied to the first room when the supply fan is not at full capacity, and which reduce a fan speed of the exhaust fan to reduce a rate of air exhausted from the first room when the supply fan is at full capacity, or determine that the first room air pressure is above the first pressure set point by the predefined threshold, and to generate instructions which reduce the fan speed of the supply fan to reduce the rate of air supplied to the first room when the exhaust fan is at full capacity, and which increase the fan speed of the exhaust fan to increase the rate of air exhausted from the first room when the exhaust fan is not at full capacity.

13. The system according to claim 12, wherein:
the first HVAC unit includes a supply variable frequency drive controlling the supply fan, and an exhaust variable frequency drive controlling the exhaust fan.

14. The system according to claim 13, further comprising:
a second controller including a second receiver, a second processor, and a second transmitter, the second receiver being configured to receive the first room air pressure measured by the room pressure sensor, the second transmitter being configured to transmit the first room air pressure to the first receiver, the second receiver being configured to receive the first pressure set point calculated by the first processor, the second processor being configured to determine whether the first room air pressure deviates from the first pressure set point by the predefined threshold, and to generate instructions for the supply and the exhaust variable frequency drives to adjust the first room air pressure to the first pressure set point, and the second transmitter being configured to transmit the instructions for the supply and the exhaust variable frequency drives to the first HVAC unit.

15. The system according to claim 12, wherein the first processor is configured to calculate the first pressure set point using only the outdoor air pressure measured by the outdoor pressure sensor and a predefined pressure differential between the first room and the outdoor air.

16. A process for dynamically balancing air pressure in a building by a controller, the building including a first room, a first heating ventilation and air conditioning (HVAC) unit for the first room, a room pressure sensor for the first room and an outdoor pressure sensor, the process comprising:

receiving an outdoor air pressure measured by the outdoor pressure sensor;

receiving a first room air pressure measured by the room pressure sensor;

calculating a first pressure set point for the first room based on the received outdoor air pressure with the controller;

determining whether the first room air pressure deviates from the first pressure set point by a predefined threshold with the controller;

generating instructions for the first HVAC unit to adjust the first room air pressure to the first pressure set point with the controller;

transmitting the instructions to the first HVAC unit; and with the controller, determining whether a supply fan of the first HVAC unit and an exhaust fan of the first HVAC unit are at full capacity, and:

determining that the first room air pressure is below the first pressure set point by the predefined threshold, and generating instructions which increase a fan speed of the supply fan to increase a rate of air supplied to the first room when the supply fan is not at full capacity, and which reduce a fan speed of the exhaust fan to reduce a rate of air exhausted from the first room when the supply fan is at full capacity, or determining that the first room air pressure is above the first pressure set point by the predefined threshold, and generating instructions which reduce the fan speed of the supply fan to reduce the rate of air supplied to the first room when the exhaust fan is at full capacity, and which increase the fan speed of the exhaust fan to increase the rate of air exhausted from the first room when the exhaust fan is not at full capacity.

17. The process according to claim 16, wherein the calculating includes calculating the first pressure set point using only the outdoor air pressure measured by the outdoor pressure sensor and a predefined pressure differential between the first room and the outdoor air.

* * * * *